3,696,076
FORMATION OF CAST FILMS OF AROMATIC POLYAMIDES
Elliot A. Vogelfanger, Edison, N.J., assignor to Celanese Corporation, New York, N.Y.
No Drawing. Filed May 22, 1970, Ser. No. 39,869
The portion of the term of the patent subsequent to July 25, 1989, has been disclaimed
Int. Cl. C08g 20/20
U.S. Cl. 260—78 R    11 Claims Aromatic diamines and aromatic diacid halides are reacted to form high-molecular weight polyamides in a mutual solvent system comprising anhydrous gamma-butyrolactone and at least one amine acid acceptor, a dipolar solvent is added, the mixture is neutralized with a base, filtered and the mixture cast directly onto a substrate and cured to form clear films.

BACKGROUND OF THE INVENTION

Field of the invention

This invention relates to polyamides and particularly relates to an improved solution method of forming polyamides at low temperature from aromatic diacid halides and aromatic diamines which are in mutual solution with an amine acid acceptor and a specific solvent, which palyamides may then be directly cast into films.

DESCRIPTION OF THE PRIOR ART

Aromatic polyamides composed entirely of alternating phenyl and carbonamide groups have excellent thermal stability and resistance to severe environmental conditions. Some reported aromatic polyamides are clear and water-white.

U.S. Pat. No. 3,006,899 discloses a combination of an aqueous solution for the aromatic diamine and a cyclic nonaromatic oxygenated organic solvent for the aromatic diacid halides.

Low temperature polymerization in dimethyl acetamide are disclosed in U.S. Pat. No. 3,240,760. This solvent and others, such as chloroform and N-methyl pyrrolidone, are also described in U.S. Pat. No. 3,063,966 for a process using an organic tertiary amine as the acid acceptor.

In copending application Ser. No. 861,491, filed Sept. 26, 1969, of E. A. Vogelfanger of the same assignee, there is disclosed a novel process for making aromatic polyamides by reacting aromatic diacid halides and aromatic diamines in a mutual solvent which also dissolves an aromatic acid acceptor and its hydrochloride salt. In the copending application, it was discovered that gamma-butyrolactone, in conjunction with amine acid acceptors without active hydrogens, functions as a most effective solvent for preparing high molecular weight aromatic polyamides. By conducting the polymerization at temperatures ranging from $-30°$ C. to $+30°$ C. or higher with e.g. 2,6-lutidine as the specific amine acid acceptor, aromatic polyamides can be obtained, by polymerizations in gamma-butyrolactone as the mutual solvent, which have inherent viscosities as high as 3.9 dl/g., as measured in 95% $H_2SO_4$ at 25° C. and 0.5 weight percent polymer.

The process of this copending application thus provides a clear advance in the art in the preparation of wholly aromatic amide polymers. However, the copending application process, as well as the other prior art in this area, fail to provide procedures by which the resulting polymer solution or mixture can be directly cast into films. The process of the present invention meets this need.

SUMMARY OF THE INVENTION

It is accordingly one object of the present invention to provide a process for the preparation of films of high-molecular weight wholly aromatic polyamides.

A further object of the invention is to provide a procedure by which such films can be cast directly from the final polymerization solution.

Other objects and advantages of the invention will become apparent as the description thereof proceeds.

In satisfaction of the foregoing objects and advantages, there is provided by this invention a process for the production of films cast directly from the final polymerization solution which comprises reacting an aromatic diamine and an aromatic diacid halide in a mutual solvent system comprising anhydrous gamma-butyrolactone and an amine acid acceptor, adding a dipolar solvent which boils near or significantly higher than gamma-butyrolactone to the resulting polymerization solution, neutralizing with a base, removing salts, casting the film and curing.

DESCRIPTION OF PREFERRED EMBODIMENTS

As indicated above, the process of the invention provides a procedure whereby polymerization solutions of wholly aromatic polyamides can be cast directly to form useful films having good properties. This procedure eliminates the additional steps of prior art procedures which require isolation of the polyamide and formation of a second solution for casting into films.

The films resulting from the direct casting process of the invention find utility in a wide variety of areas as they possess excellent physical and chemical characteristics. Thus they are useful as aviation and automotive interior head liner materials, decorative trim, high temperature electrical insulation such as slot liners, in dry transformers, capacitors, cable wrappings, packaging of items to be exposed to high temperatures or high energy radiation, containers and container linings, printed circuits, laminated structures and the like. Hence, the films produced by this invention find use in a wide variety of areas.

As mentioned above the wholly aromatic polyamides whose reaction product solutions are employed to directly cast the films of the invention are prepared by the initial reaction of aromatic amines and aromatic diacid chlorides. This specific reaction is disclosed and claimed in copending application Ser. No. 861,491 mentioned above.

The process of the invention is suitable for polymerizing such aromatic diamines as 4,4'-diamino-diphenyl-sulfone, 4,4'-oxydianiline, 4,4'-diphenyldiamine, and the corresponding 3,3'-derivatives. Aromatic diacid chlorides which can be polymerized according to the process of this invention include: 4,4'-sulfonyldibenzoyl chloride, 4,4'-oxydibenzoyl chloride, 4,4'-dibenzoyl chloride and the corresponding 3,3'-derivatives. Furthermore, any mixture of isophthaloyl chloride, terephthaloyl chloride, meta-phenylene diamine and para-phenylene diamine may be used according to this invention.

The amine acid acceptor is preferably 2,6-lutidine. However, in addition to 2,6-lutidine (2,6-dimethyl pyridine), other nitrogen-based acid acceptors can be employed in the polymerization of this invention provided that the pKa of the protonated base be at least 0.5 unit and preferably more than 1 unit greater than the pKa of the aromatic diamine monomers. Suitable examples of other amine acceptors comprise triethylamine, pyridine, and 2,4,6-collidine (2,4,6-trimethyl pyridine), and the like as well as mixtures thereof.

In this process, higher molecular weights of polyamides are obtainable if the acid acceptors used are soluble, both in the amine form and in the hydrochloride salt form, in gamma-butyrolactone. The miscibility of the amine acid acceptor with the solvent allows the former to trap hydrochloric acid generated during the polymerization as rapidly as it is formed. The presence in solution of the acid acceptor hydrochloride salt (e.g., lutidinium hydrochloride) has the effect of solubilizing the aromatic polyamide in the same manner as does added lithium chloride or calcium chloride in dimethyl formamide or dimethyl acetamide and thus allowing polymerization to be prolonged.

The process is conducted by contacting the diamine and acid halide in the butyrolactone solvent containing the amine acid acceptor under an inert gas (e.g. nitrogen, argon, etc.) atmosphere at low temperature, e.g. from about $-30°$ to $50°$ C., cooling being effected for example with a Dry Ice bath. In a preferred procedure, the acid halide is gradually added to a mixture of the other ingredients under conditions of agitation.

The entire polymerization solution resulting from this reaction is utilized as the starting point of this invention for direct casting of films therefrom. According to this invention, there is added to the resulting mixture a quantity of a powerful dipolar solvent which has a boiling point near or significantly higher than the gamma-butyrolactone solvent. The quantity of dipolar solvent added may range from about 10 to 150 weight percent of the total polymerization solution and more preferably about 15–40 weight percent. The addition is carried out at about room temperature and preferably immediately following the polymerization reaction.

Any highly dipolar solvent boiling near or significantly higher than the butyrolactone may be employed. However, such materials preferably include amide-type organic compounds such as those of the general formula:

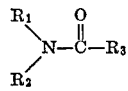

wherein $R_1$, $R_2$ and $R_3$ are the same or different and are lower alkyl radicals of 1 to 7 carbon atoms, cycloalkyl of 3 to 8 carbon atoms, an aryl radical of 6 to 15 carbon atoms, aralkyl or alkaryl radical of 7 to 15 carbon atoms or any two of $R_1$, $R_2$ and $R_3$ form an alkylene chain of 4 to 6 carbon atoms which together with the nitrogen atom form a heterocyclic ring. Especially preferred compounds are N-cycloalkyl-2-pyrrolidone, N-ethyl-2-pyrrolidone, N,N-diethyl butyramide and the like as well as mixtures thereof. The N-cycloalkyl, N-alkyl and N-aryl-2-pyrrolidones are especially preferred.

The resulting well agitated generally opaque viscous solution is then neutralized by addition of a base in sufficient amount to free the hydrohalides present. The base is preferably an inorganic base such as an alkali metal or alkaline earth metal carbonate, bicarbonate, hydroxide, oxide or mixture thereof. Preferred bases are the alkali metal (Na, K or Li) or alkaline earth metal (Mg, Sr, Ca or Ba) carbonates or bicarbonates. On addition of the base, agitation is continued until any gas evolution (e.g. $CO_2$) ceases. Then the clear solution or dope is separated from any unreacted base or salt formed as by filtration at room temperature.

The resulting solution may then be cast directly on any desired substrate to form clear films, the casting being carried out by conventional techniques.

After casting, the films are cured in conjunction with or without solvent leaching in any desired manner by heat and/or solvent extraction at temperatures up to about $250°$ C. A highly preferred curing procedure is by stage curing, that is, initial curing for short periods at lower temperatures followed by a final stage at a relatively high temperature for several hours. For example a very effective method of curing is to heat at about $130°$ C. for 20 minutes, then at about $180°$ C. for about 40 minutes and a final curve at $230°$ C. for about 50–100 hours.

The golden clear films resulting from this procedure exhibit tensile strengths and tensile elongations comparable to films cast by the conventional complicated procedures.

It is reiterated that the primary novelty of the present invention resides in the feature that excellent films may be cast directly from the final polymerization solution or dope thus obviating many of the problems of the art which use complicated techniques for casting films of wholly aromatic polyamides.

The details and comparative advantages of the process of this invention may be clearly understood from consideration of the following examples in which the best mode of carrying out the invention is set forth.

EXAMPLE I

Preparation of polymer solution.—A 3-neck 500 ml. flask, equipped with stirring equipment, nitrogen, inlet, and drying tube, was fitted with a Dry Ice bath capable of cooling the reaction flask to $-30$ C. To this flask 126 grams of gamma-butyrolactone, 14.7 grams of m-phenylene diamine, and 39.0 grams of 2,6-lutidine were added. While stirring, 27.7 grams of phthaloyl chloride, as a mixture of 70% iso- and 30% terephthaloyl chlorides, were added. The temperature was maintained at about $0°$ C. Upon complete addition of the phthaloyl chlorides, the reaction mixture became extremely viscous and additional solvent was added. The resultant polyamide was then precipitated by addition to a Waring blender containing three parts of water to one part of polymer solution. The polymer was washed three times until neutral and then vacuum dried overnight at $100°$ C. The inherent viscosity of the polymer, measured in 95% $H_2SO_4$ was 2.3 dl./g.

EXAMPLE II

Casting of the film.—To 140 grams of the final butyrolactone-lutidine polymerization solution for the aromatic polyamide derived from the 70/30 mixture of iso-terephthaloylchloride and an equal molar quantity of meta-phenylenediamine of Example I are added 60 grams of N-cyclohexyl pyrrolidone. To this well stirred, opaque, viscous solution are added 17.2 grams of sodium bicarbonate. After the extensive evolution of carbon dioxide is completed, the clear polyamide solution or dope is filtered to remove unreacted sodium bicarbonate and insoluble sodium chloride formed as a result of the neutralization of lutidine-hydrochloride by the bicarbonate salt. Using this dope, films are then cast on Pyrex plates by conventional techniques. The particular curing heat cycle employed is as follows: 20 minutes at $130°$ C., 40 minutes at $180°$ C. and finally 72 hours at $230°$ C. The clear golden films prepared in this manner exhibited a tensile strength at $220°$ C. of 7,070 p.s.i. and a tensile elongation of 2%. These are typical properties of aromatic polyamide films prepared from dimethyl acetamide or dimethyl formamide dopes made from precipitated flake when heat cured in a similar manner.

EXAMPLE III

This example illustrates use of a 70/30 mixture of meta/para phenylene diamine and 100% isophthaloyl chloride to form a polymerization solution.

A 5 liter five-neck resin kettle was equipped with the following services:

(a) A sized double spiral agitator driven by a heavy duty drill;
(b) Thermometer;
(c) Nitrogen inlet;
(d) Drying tube-nitrogen outlet; and
(e) Dropping tube containing 425 grams of molten iso-phthaloyl chloride.

To the resin kettle were added 158 grams of distilled meta-phenylene diamine, 68 grams para-phenylene diamine, 470 grams of 2,6-lutidine, undistilled, and 2,564 grams of distilled gamma-butyrolactone. The mixture was stirred under nitrogen at room temperature for about 15 minutes to dissolve the para-phenylene diamine. The molten iso-phthaloyl chloride was then added over one-half hour while the reaction mixture was maintained at 30° C., by the application of a Dry Ice-gamma-butyrolactone bath at −40° C. At this point the viscous reaction mixture was stirred for an additional 20-30 minutes to obtain the polymerization solution.

EXAMPLE IV

Casting of the film.—To 280 grams of the final butyrolactone-lutidine polymerization solution from Example III was added 120 grams of N-cyclohexyl pyrrolidone. To this well stirred opaque viscous solution was added 17 grams of potassium carbonate. After the extensive evolution of carbon dioxide was completed, the clear polyamide solution was filtered to remove unreacted potassium carbonate and insoluble potassium chloride formed as a result of the neutralization of lutidine-hydrochloride by the carbonate salt. Using this dope, films were then cast on Pyrex plates by conventional techniques. The particular curing heat cycle employed is as follows: 30 minutes at 140° C., 50 minutes at 190° C. and finally 80 hours at 240° C. The clear golden films prepared in this manner exhibited a tensile strength at 220° C. of 7,070 p.s.i. and a tensile elongation of 2%.

The invention should not be limited to the specific exemplary information given hereinbefore, for various modifications can be made without departing from the spirit of the invention.

What is claimed is:

1. In a process for preparing cast film of high molecular weight wholly aromatic polyamides which comprises reacting an aromatic diamine and an aromatic diacid halide in the presence of an amine acid acceptor lacking an active hydrogen, said acceptor having a pKa at least 0.5 unit greater than the pKa of said aromatic diamine, and a solvent comprising anhydrous gamma-butyrolactone, the improvement comprising adding a dipolar solvent which boils near or significantly higher than gamma-butyrolactone to the resulting mixture, neutralizing the reaction product with a base, removing any solids present and thereafter casting said film.

2. An improved process according to claim 1 wherein said dipolar solvent is a compound selected from those of the formula:

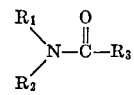

wherein $R_1$, $R_2$ and $R_3$ are the same or different and are lower alkyl of 1 to 7 carbon atoms, cycloalkyl of 3 to 8 carbon atoms, aryl of 6 to 15 carbon atoms, aralkyl of 7 to 15 carbon atoms or any two of $R_1$, $R_2$ or $R_3$ form an alkylene chain of 4 to 6 carbon atoms which together with the nitrogen atom form a hererocyclic ring.

3. An improved process according to claim 2 wherein the amount of dipolar solvent added is about 10 to 150 weight percent of the weight of the polymerization solution.

4. An improved process according to claim 3 wherein the solution is neutralized with a base selected from the group consisting of alkali metal and alkaline earth metal carbonates, bicarbonates, hydroxides, oxides and mixtures thereof.

5. An improved process according to claim 4 wherein the films are cured by heating at a temperature of about 120° C. to about 250° C.

6. An improved process according to claim 5 wherein the dipolar solvent is selected from the group consisting of N-alkyl-, N-cycloalkyl-, N-aryl-, N-aralkyl- and alkaryl-2-pyrrolidones, piperidines and caprolactams.

7. An improved process according to claim 6 wherein the dipolar solvent is N-cycloalkyl pyrrolidone and the base is sodium bicarbonate.

8. An improved process according to claim 7 in which said amine acid acceptor is 2,6-lutidine.

9. An improved process according to claim 8 in which said aromatic diamines comprise meta-phenylene diamine and para-phenylene diamine.

10. An improved process according to claim 9 in which said aromatic diacid chlorides comprise a mixture of iso-phthaloyl chloride and terephthaloyl chloride.

11. An improved process according to claim 10 in which meta-phenylene diamine is 70% by weight and para-phenylene diamine is 30% by weight of said aromatic diamine.

References Cited
UNITED STATES PATENTS

| | | | |
|---|---|---|---|
| 3,006,899 | 10/1961 | Hill et al. | 260—78 R |
| 3,063,966 | 11/1962 | Kwolek et al. | 260—78 R |
| 3,094,511 | 6/1963 | Hill et al. | 260—78 R |
| 3,240,760 | 3/1966 | Preston | 260—78 R |

HAROLD D. ANDERSON, Primary Examiner

U.S. Cl. X.R.

260—47 CZ; 264—216